Feb. 1, 1966    R. B. CLARK    3,232,680
FLUID BEARING
Filed Aug. 19, 1963

INVENTOR.
RICHARD B. CLARK
BY Lyon & Lyon
ATTORNEYS

United States Patent Office 3,232,680
Patented Feb. 1, 1966

3,232,680
FLUID BEARING
Richard B. Clark, Granada Hills, Calif., assignor to
Whittaker Corporation, a corporation of California
Filed Aug. 19, 1963, Ser. No. 302,826
5 Claims. (Cl. 308—9)

This invention relates to hydrostatic and hydrodynamic fluid bearings and, in particular, is directed to a construction of such bearings producing improved operational characteristics and ease of manufacture.

There are numerous conventional thrust and journal bearings of the fluid or frictionless type wherein there is a predetermined gap between the relatively moving parts and a pressurized fluid within such gap maintains the spacing between two relatively moving parts. These bearings are generally considered to be within one of two broad categories of first, hydrostatic bearings where the pressurized fluid is continually supplied to and escapes from the space between the relatively movable parts and second, hydrodynamic bearings where the fluid between the moving parts is pressurized by the relative movement of the parts. The hydrostatic bearing functions whether there is little or no movement between the relatively movable parts whereas the hydrodynamic bearing requires a high rate of relative movement between the parts in order to produce the pressures necessary to attain adequate supports between the parts.

Since fluid bearings depend on the force produced by the pressurized fluid acting upon the areas of the parts at the space between the parts containing the fluid, the dimensions and tolerances of the parts are relatively critical and must be maintained in order to obtain the desired operating characteristics. Further, care must be taken in selecting the materials used for the components of conventional fluid bearings so that temperature changes during operation do not adversely affect operational characteristics or, as an alternative, means must be provided for maintaining a constant temperature of the components of the bearing in order to avoid the effects of expansion and contraction of the components due to changes in temperature. Moreover, it has been found with many conventional fluid bearings that precision machined choking nozzles must be provided in order to achieve and maintain proper flow of the pressurized fluid between the relatively movable parts. Even with precision machined parts the characteristics of one bearing may differ from the other, supposedly identical, bearings. Moreover, many of the hydrostatic fluid bearings require continued supply of a large quantity of pressurized fluid and that the supply pressure be constant in order to obtain the desired operational characteristics.

There are numerous environments in which a fluid bearing is particularly applicable for producing a substantially frictionless bearing such as in gyroscopes, turbines and pendulous and angular accelerometers. Many such uses of fluid bearings require support in both radial and axial directions and thus in effect require both a journal bearing and a thrust bearing. While there have been attempts to provide fluid bearings combining both radial and thrust bearing characteristics, such attempts have been somewhat unsuccessful and, therefore, separate components are generally provided for achieving the two separate characteristics. Moreover, conventional fluid bearings generally produce unsatisfactory support against torque loads applied about an axis perpendicular to the free rotational axis of the bearing.

Accordingly, by this invention there is provided a fluid bearing employing spaced annular inlet and outlet orifices with a relatively noncritically dimensioned area therebetween for accommodating the pressurized fluid to produce the desired bearing support whereby construction of the bearing is simplified since only the orifices are of critical dimensioning and machine finishing. Further, by appropriately arranging these inlet and outlet orifices on a pair of spaced conical surfaces, a combination of radial and thrust fluid bearing is obtained and appropriate variance of the angles of the conical surfaces will produce the desired response or compliance to given torsional, radial and thrust loads.

It is, therefore, an object of this invention to provide a novel form of fluid bearing wherein inlet and outlet orifices are formed between the relatively movable parts with the area between such orifices serving to contain the supporting pressurized fluid whereby only the orifices are dimensionally critical so that cost of manufacture is minimized. A further object is to provide such a novel fluid bearing construction which is very efficient in terms of fluid pressure employed and fluid volume used by reason of employing such inlet and outlet orifices. Still a further object is to provide such a bearing wherein that area between inlet and outlet orifices is circumferentially divided in spaced depressions or pads whereby circumferential communication of the pressurized fluid is inhibited to produce a greater reaction force when an external force urges the component parts out of normal alignment.

Another object of this invention is to provide a novel form of fluid bearing employing the surfaces of axially spaced conical frustums as the surfaces forming the gaps between the relatively movable parts whereby the bearing functions as both a thrust and journal bearing. A further object is to provide such a bearing wherein the apexes of such conical surfaces coincide at a point on the rotational axis of the bearing whereby expansion or contraction of the parts of the bearing due to changes in temperature does not produce a significant change in the spacing between the relatively movable parts at such conical surfaces.

Still another object of this invention is to provide a novel form of fluid bearing employing such conical surfaces wherein the provision of a predetermined angle of such conical surfaces will produce desired compliance or response by the bearing to axial or radial loads and torques. Further, an object is to provide such a bearing having conical surfaces of a particular angle whereby the bearing is isoelastic in that it has equal compliance to the same load applied in any direction.

Other and more detailed objects and advantages of this invention will appear from the following description and the accompanying drawings.

Figure 1:
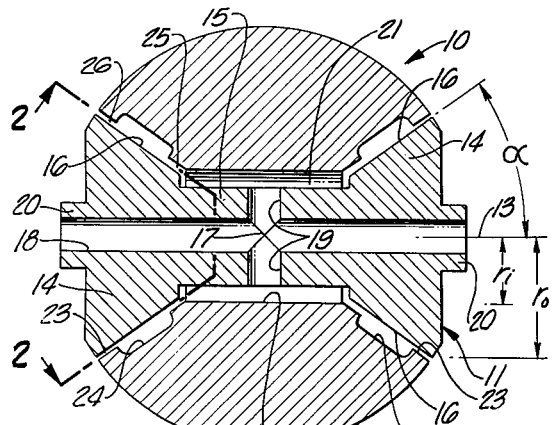
FIGURE 1 is a sectional view of a fluid bearing of this invention with such section taken through the rotational axis of the bearing.

Referring now more particularly to FIGURE 1 the hydrostatic fluid bearing, generally designated 10, of this invention is comprised of a stator 11 surrounded by a rotor 12. While the illustrated embodiment of this invention is shown and will be described as having the moving portion of the bearing surrounding the stationary portion of the bearing, it is to be understood and will readily appear to those skilled in the art that this relationship may readily be reversed as required by a particular installation without departing from this invention by mere nominal changes in structure such as location of the attachment of the supply of pressurized fluid.

The stator 11 is symmetrical about its longitudinal axis 13, and axis 13 also comprises the free axis of the bearing about which rotor 12 may rotate. Stator 11 is provided wtih axially spaced conical frustum portions 14 integrally joined by a rod portion 15. Since stator 11 is symmetrical about axis 13, the axes of the conical surfaces 16 of the conical frustum portions 14 coincide with axis 13 and the angle between the axis and the surface of the cones is designated α. It is to be noted that the angle α is actually one-half of the angle at the apex of the cones. The cones coinciding wtih conical surfaces 16 preferably have their apexes meet at a point 17 on axis 13 for reasons that will hereinafter be described. However, it is to be understood that such relationship of cone apexes is not essential and in fact the conical surfaces 16 may face in opposite directions thereby causing the cone apexes to be widely spaced axially beyond the conical surfaces. The stator 11 is provided with a central bore 18 communicating with lateral bores 19 in the rod portion 15 for supplying fluid under pressure from an external source through either of the ends 20 to the internal annular cavity 21 between the rotor and the stator.

The rotor 12 surrounds the stator 11 as shown and has an internal bore 22 larger than the outside diameter of rod portion 15 of the stator thereby forming the annular cavity 21 between the rotor and stator. The rotor is provided with a pair of conical cavities 23 having generally conical surfaces coinciding with cones that have their axes coinciding with axis 13. These conical surfaces form an angle with axis 13 substantially equal to the angle α, heretofore described.

The rotor and stator are of appropriate longitudinal and radial dimensions so that a small space or gap is formed between each of the conical surfaces 16 of the stator 11 and the associated conical cavity 23 of the rotor when both the rotor and stator are appropriately aligned with axis 13. Thus, the pressurized fluid supplied to annular cavity 21 is permitted to continually escape through the two conical spaces formed by the conical surfaces 16 mating with conical cavities 23 to accomplish the fluid support of the rotor 12 on the stator 11.

The generally conical surfaces of the cavities 23 are provided with depressions or pads 24 for receiving and temporarily containing a larger volume of the pressurized fluid than would be present if cavity 23 had a smooth conical surface. The depressions or pads 24 extend less than the longitudinal extent of conical cavities 23 thereby forming an inlet orifice 25 between annular cavity 21 and the pad 24, and an outlet orifice 26 between the pad 24 and the atmosphere surrounding bearing 10. Further, it is preferred that the depressions or pads 24 do not extend circumferentially the entire extent of conical cavity 23 but rather are divided into individual spaced pads.

Figure 2:
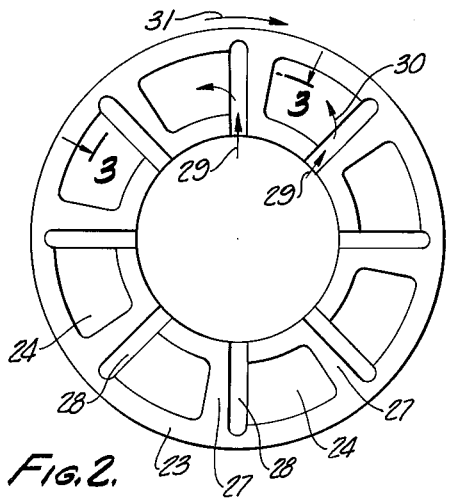
FIGURE 2 is a sectional view taken substantially on the line 2—2 shown in FIGURE 1 and illustrating a configuration of the conical surface of the bearing which is particularly applicable for use with a hydrodynamic type fluid bearing.
Figure 3:
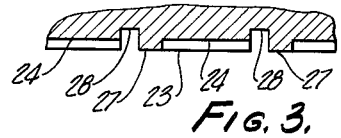
FIGURE 3 is a fragmentary sectional view taken substantially on the line 3—3 shown in FIGURE 2.
Figure 7:
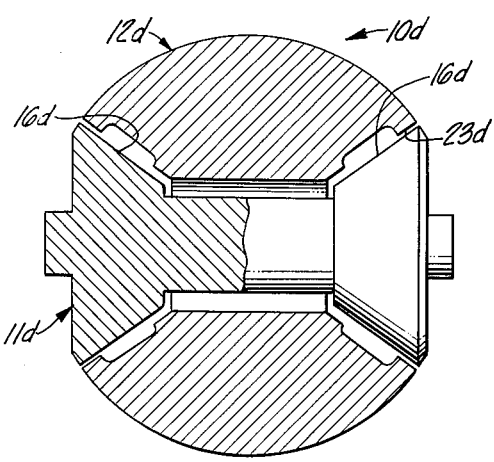
FIGURE 7 is a sectional view similar to FIGURE 1 illustrating a hydrodynamic fluid bearing of this invention.

Referring particularly to FIGURES 2 and 3, it may be seen that the depressions or pads 24 are separated by ribs 27. The surface or ribs 27 coincide with the conical surface of the cavity 23 and therefore extend continuously between the portions of cavity 23 that form the inlet orifice 25 and outlet orifice 26 and are closely spaced from conical surface 16 of the stator. The pad configuration illustrated in FIGURES 2 and 3 is particularly applicable for use with a hydrodynamic bearing such as shown in FIGURE 7 although the pad configuration will function satisfactorily in a hydrostatic bearing 10 as it is shown. A groove 28 is provided in cavity 23 extending from the inner extremity at bore 22 along the full longitudinal extent of pad 24. Grooves 28 are deeper than pads 24 and are all positioned on the same side of the associated pad 24 whereby pressurized fluid entering groove 28 in the direction of arrows 29 will then flow circumferentially into the pads in the direction of arrows 30. When this pad configuration is employed in a hydrodynamic bearing rotor 12 is rotated in the direction of arrow 31 in FIGURE 2 with respect to the stationary stator 11 so that the proper fluid flow is induced.

Figure 4:
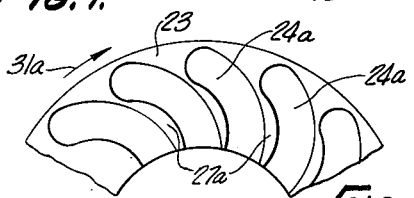
FIGURE 4 is a fragmentary view similar to FIGURE 2 illustrating a modified configuration of a conical surface also particularly adaptable for use in a hydrodynamic bearing.

Referring now to FIGURE 4, another pad configuration is shown that is particularly adaptable to hydrodynamic bearings but may also be used in hydrostatic bearings. The pads 24a spiral out from the bore 22 of the rotor and terminate short of the out extent of the conical cavity 23. Ribs 27a remain between pads 24a similar in function to the ribs 27 between pads 24. When this pad configuration is employed in a hydrodynamic bearing the rotor is rotated in the direction of arrow 31a to induce proper fluid flow.

Figure 5:
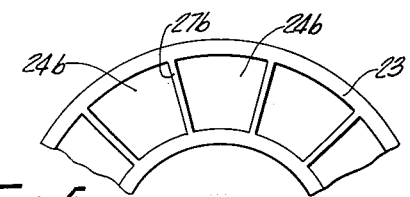
FIGURE 5 is a fragmentary view similar to FIGURE 4 of a configuration particularly adaptable for use in a hydrostatic bearing.

Referring now to FIGURE 5, a pad configuration is shown that is particularly adapted for use in hydrostatic bearing 10 where pressurized fluid is continually supplied. The individual depressions or pads 24b are separated by ribs 27b similar to ribs 27. The annular surface 29b is spaced from stator surface 16 to form the inlet orifice 25 to the pads and the outer annular surface 30b is spaced from stator surface 16 to form the outlet orifice 26.

Figure 6:
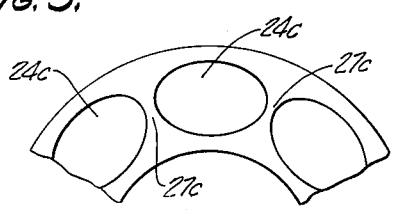
FIGURE 6 is a fragmentary view similar to FIGURES 4 and 5 illustrating a configuration particularly adaptable for use in a hydrostatic bearing.

Referring particularly to FIGURE 6, a modified form of pad configuration is shown for use with a hydrostatic bearing wherein the pads 24c are oval in shape and separated by ribs 27c.

The hydrodynamic bearing 10d of FIGURE 7 is substantially similar to the hydrostatic bearing 10 of FIGURE 1 except that no fluid passages are needed and rotor 12d must be rotated at a very high rate relative to stator 11d in order to produce the necessary fluid pressure in the gap between conical surfaces 16d of the stator and conical cavities 23d of the rotor. That fluid pressure is produced is well known to those skilled in the art and by using pad configurations of the type of FIGURES 2, 3 and 4 this effect is enhanced.

With a fluid bearing of this invention such as hydrostatic bearing 10, the pressurized fluid in the area of the pads exerts equal and opposite forces on the conical surface 16 of the stator and the conical cavity 23 of the rotor in a direction normal to those surfaces. Since the conical surfaces are at an angle to the axis 13, the forces are in both radial and axial directions and since both conical surfaces 16 are at the same angle the axial forces balance out thereby supporting the rotor in a centralized position. The application of an external force on the rotor, whether axially or radially, tends to close the gap in one location and open the gap in another. However, closing the gap tends to close outlet orifice 26 thereby causing the full fluid pressure to be applied at the pads in that location whereas opening the gap opens orifice 26 and relieves the pressure, thus causing the rotor to be urged back to its original centralized position. It is preferred that the cross-sectional areas of orifices 25 and 26 be related in such a manner as to produce relatively equal pressure drops across the two orifices for the fluid being used. For incompressible fluids, the cross-sectional area of orifice 26 is preferably equal to or less than that of orifice 25 and therefore, since orifice 26 is at a larger diameter than orifice 25, the gap at orifice 26 is smaller than the gap at orifice 25. However, for compressible fluids and particularly with small values of angle $\alpha$, the gap at orifice 26 may be larger than the gap at orifice 25 in order to produce the desired equal pressure drop across the orifices.

Figure 8:
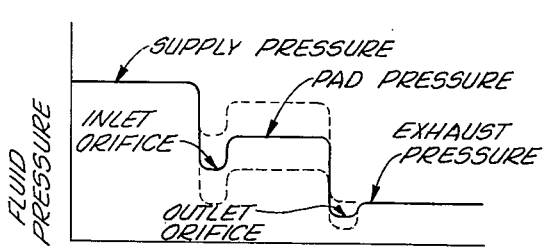
FIGURE 8 is a graph qualitatively illustrating the relationship of fluid pressure to location along the conical surface.

By reference to the graph of FIGURE 8, it may qualitatively be seen that the fluid pressure will vary along a longitudinal line on the surface 16. The solid line indicates the relationship when the rotor is centralized, the upper dashed line indicates the relationship at a longitudinal line where the gap has been closed, and the lower dashed line indicates the relationship at a longitudinal line where the gap has been opened. As noted above, when the gap is closed and pressure increases at the pad area above that pressure which is normal, and when the gap opens the pressure drops below normal. Further, under normal operation the pressure drops across the inlet and outlet orifices are equal. It is also to be noted from the graph of FIGURE 8 that due to the Bernoulli effect, the fluid pressure is less at the outlet and inlet orifices than on either side of the orifices and thus the great majority of the supporting forces is supplied at the pads.

Thus, any small inaccuracies in the machining of the surfaces forming the orifices will not greatly affect the operation of the bearing.

Since the fluid pressure forces supporting the rotor are perpendicular to the conical surfaces, it may be seen that for a particular bearing as angle $\alpha$ increases toward 90° the bearing will have the characteristics of a thrust bearing whereas as angle $\alpha$ approaches zero degree, the bearing will have only the characteristics of a journal or radial bearing. Thus, for a particular installation, if it is known that there is a certain ratio of thrust loads to radial loads that will be applied then an angle $\alpha$ may be provided which gives the needed response or compliance in each direction. If it is desired that a particular bearing have equal compliance to the same load applied in any direction thereby producing an isoelastic bearing, the angle $\alpha$ can be appropriately adjusted. Further, the angle $\alpha$ may be calculated to produce this isoelastic compliance for the bearing like bearing 10 by making certain assumptions.

Assume a fluid bearing of the type of this invention wherein, for simplification of mathematical calculations, the conical surfaces of the rotor and stator are not provided with the pads or depressions and the surfaces converge toward the outlet orifice or portion at a small angle designated $\gamma$. Further assume that such bearing is divided into four sectors for determining the effects of pressures and changes in the spacing between the conical surfaces of the rotor and stator with each mating pair of surfaces comprising two sectors of 180° each. For example, referring to FIGURE 1, the upper one-half (formed by a plane passing through the axis of the stator perpendicular to the figure) of the right-hand mating conical surfaces is assumed to be sector 1, the lower one-half of those right-hand mating conical surfaces is sector 2, the upper one-half of the left-hand conical surfaces is sector 3, and the lower one-half of the left-hand conical surfaces is sector 4. Thus, by way of illustration, moving the stator straight downwardly within the rotor as viewed in FIGURE 1 would amount to a closing of the space between conical surfaces of sectors 2 and 4 and opening the space in sectors 1 and 3. Also, assume the following symbols for dimensions, angles and properties for a fluid bearing:

$F_a$ = Force on rotor in axial direction, externally applied;
$F_r$ = Force on rotor in radial direction, externally applied;
$a$ = Axial movement of rotor due to $F_a$;
$r$ = Radial movement of rotor due to $F_r$;
$r_o$ = Radius of conical surface at outlet (FIGURE 1);
$r_i$ = Radius of conical surface at inlet (FIGURE 1);
$r_s$ = Radius of conical surface at termination of angle $\gamma$ (equal to $r_o$ if angle $\gamma$ extends entire length of conical surfaces to outlet);
$b$ = Distance along conical surface from inlet to assumed point $b$;
$r_b$ = Radius of conical surface at the point $b$;
$b_o$ = Distance along conical surface from inlet to outlet;
$b_s$ = Distance along conical surface from inlet to the termination of angle $\gamma$;
$h$ = Gap between conical surfaces at the point $b$;
$h_i$ = Gap between conical surfaces at inlet;
$h_o$ = Gap between conical surfaces at outlet;
$\alpha$ = Angle between bearing axis and conical surface (i.e., one-half of conical angle at apex; see FIGURE 1;)
$\theta$ = Angle between the plane through axis forming the sector and a line perpendicular to the axis from the axis to point $b$;
$A_a$ = Projected area of conical surface in an axial direction;
$A_r$ = Projected area of conical surface in radial direction;
$P$ = Force exerted by fluid pressure on the conical surfaces at the point $b$;

then, given $r_o$, $r_i$, and $h_o$ find $\alpha$, $\gamma$, and $r_s$ for an isoelastic fluid bearing wherein $$\frac{a}{Fa} = \frac{r}{Fr}$$

$$A_a \underline{\Delta} \pi (r_o^2 - r_i^2)$$

$$A_r \underline{\Delta} 2(r_o + r_i) \frac{r_o - r_i}{\tan \alpha} = \frac{2}{\tan \alpha}(r_o^2 - r_i^2)$$

$h_{o_1} \underline{\Delta} h_{o_2} h_{o_3} = h_{o_4}$ in normal position, with subscripts 1, 2, 3 and 4 indicating sectors Assume $h_i \ll r_i$; $\sin \gamma = \tan \gamma$; $\gamma \ll \alpha$ $$b_o = \frac{r_o - r_i}{\sin \alpha} b_s = \frac{r_s - r_i}{\sin \alpha} b = \frac{r_b - r_i}{\sin \alpha}$$

$$\Delta b = \frac{\Delta r_b}{\sin \alpha}$$

$$h_i = b_s \sin \gamma + h_o = h_o + \gamma \frac{r_o - r_i}{\sin \alpha}$$

$$h = h_o + (b_s - b)\gamma = h_o + \gamma \frac{r_s - r_b}{\sin \alpha} \begin{bmatrix} \text{When,} \\ 0 < b < b_s \end{bmatrix}$$

$$h = h_o \begin{bmatrix} \text{When,} \\ b_s < b < b_o \end{bmatrix}$$

$$\Delta h_{1,2} = -a \sin \alpha - r \cos \alpha \sin \theta$$
$\qquad$ Sectors 1 & 2

$$\Delta h_{3,4} = +a \sin \alpha - r \cos \alpha \sin \theta$$
$\qquad$ Sectors 3 & 4

$$P = f(w, p, \mu, \alpha, r_o, r_i, h_o, r_s, r_b, \theta, a, r)$$

Rotational velocity—$w$
Properties of gas—$p$, $\mu$
Bearing geometry—$\alpha$, $r_o$, $r_i$, $h_o$, $\gamma$, $r_s$
Location on bearing—$r_b$, $\theta$
Bearing linear displacement—$a$, $r$
P stator = P rotor For first approximate solution assume:
(1) $P$ = Constant = $P_0$ over entire bearing surface for $\Delta h = 0$
(2) $\Delta P = -K \Delta h$ for $\Delta h < \frac{1}{10} h_o$
(3) $P$ perpendicular to bearing surface (neglect viscous drag)

$$F_a = + \sum_0^{2\pi} \sum_{r_i}^{r_o} \underbrace{(P_o + \Delta P_{1,2}) \Delta r_b \Delta \theta \sin \alpha}_{\text{Sectors 1 & 2}} -$$

$$\sum_0^{2\pi} \sum_{r_i}^{r_o} \underbrace{(P_o + \Delta P_{3,4}) \Delta b r_b \Delta \theta \sin \alpha}_{\text{Sectors 3 \& 4}}$$

$\Delta b = \Delta r_b \div \sin \alpha$
$\Delta P_{1,2} = -K \Delta h_{1,2} = -K(a \sin \alpha - r \cos \alpha \sin \theta)$
$\Delta P_{3,4} = -K \Delta h_{3,4} = -K(a \sin \alpha - r \cos \alpha \sin \theta)$ $$F_a = + \sum \sum P_o r_b \Delta r_b \Delta \theta + \sum \sum Ka \sin \alpha r_b \Delta r_b \Delta \theta + \\ \sum \sum Kr \cos \alpha \sin \theta r_b \Delta r_b \Delta \theta - \sum \sum P_o r_b \Delta r_b \Delta \theta + \\ \sum \sum Ka \sin \alpha r_b \Delta r_b \Delta \theta - \sum \sum Kr \cos \alpha \sin \theta r_b \Delta r_b \Delta \theta$$

$$= 2Ka \sin \alpha \int_0^{2\pi} \left[ \int_{r_i}^{r_o} r_b dr_b \right] d\theta$$

$$F_a = 2Ka \sin \alpha \pi (r_o^2 - r_i^2) = 2Ka \sin \alpha A_a$$

$$\frac{F_a}{a} = 2KA_a \sin \alpha = 2K\pi \sin \alpha (r_o^2 - r_i^2)$$

$$F_r = + \sum_0^{2\pi} \sum_{r_i}^{r_o} (P_o + \Delta P_{1,2}) \Delta_b r_b \Delta \theta \cos \alpha \sin \theta +$$

$$\sum_0^{2\pi} \sum_{r_i}^{r_o} (P_o + \Delta P_{3,4}) \Delta b r_b \Delta \theta \cos \alpha \sin \theta$$

$$= + \sum \sum P_o \cot \alpha \, r_b \Delta r_b \Delta \theta \sin \theta +$$

$$\sum \sum Ka \cos \alpha r_b \Delta r_b \Delta \theta \sin \theta +$$

$$\sum \sum Kr \frac{\cos^2 \alpha}{\sin \alpha} r_b \Delta r_b \Delta \theta \sin^2 \theta$$

$$+ \sum \sum P_o \cot \alpha r_b \Delta r_b \sin \theta \Delta \theta -$$

$$\sum \sum Ka \cos \alpha r_b \Delta r_b \Delta \theta \sin \theta +$$

$$\sum \sum Kr \frac{\cos^2 \alpha}{\sin \alpha} r_b \Delta r_b \sin^2 \theta \Delta \theta$$

$$= 2P_o \cot \alpha \int_0^{2\pi} \left[ \int_{r_i}^{r} r_b dr_b \right] \sin \theta d\theta +$$

$$2Kr \frac{\cos^2 \alpha}{\sin \alpha} \int_0^{2\pi} \left[ \int_{r_i}^{r_o} r_b dr_b \right] \sin^2 \theta d\theta$$

$$= 2P_0 \cot \alpha \frac{1}{2} (r_o^2 - r_i^2)(-\cos 2\pi + \cos \theta) +$$

$$2Kr \frac{\cos^2 \alpha}{\sin \alpha} \frac{1}{2}(r_o^2 - r_i^2) \left[ \left( \frac{2\pi}{2} - \frac{\sin 4\pi}{4} \right) - \left( \theta - \frac{\sin \theta}{1} \right) \right]$$

$$F_r = K_r \frac{\cos \alpha}{\tan \alpha}(r_o^2 - r_i^2) \pi \frac{1}{2} Kr \cos \alpha A_r \pi$$

$$\frac{F_r}{r} = \frac{1}{2} K A_r \pi \cos \alpha = K \pi \frac{\cos \alpha}{\tan \alpha}(r_o^2 - r_i^2)$$

If, $$\frac{F_r}{r} = \frac{F_a}{a}$$

Then, $$2K \sin \alpha A_a \frac{1}{2} K \cos \alpha A_r \pi$$

$$\frac{A_r}{A_a} = \frac{4}{\pi} \tan \alpha$$

$$K\pi = \frac{\cos \alpha}{\tan \alpha} = (r_o^2 - r_i^2) = 2K\pi \sin \alpha (r_o^2 - r_i^2)$$

$$\frac{\cos^2 \alpha}{\sin \alpha} = 2 \sin \alpha$$

$$\tan^2 \alpha = \frac{1}{2}$$

$$\alpha = \tan^{-1} .70711$$

$$\alpha = 35°15\frac{38'}{44}$$

$$\alpha = 35.2644°$$

Since the angle $\alpha$ is a discrete angle the isoelastic properties of the bearing will be independent of other bearing dimensions within the framework of the assumptions that have been made, that is, neglecting viscous forces, assuming pressure change is linear with gap change, etc. This last assumption is probably valid so long as $\Delta h < \frac{1}{10} h_0$, $b_0 < r_0$, $h_i << r_i$ and $\gamma << \alpha$. In practical application a small adjustment in angle $\alpha$ will be necessary to offset the effects of these assumptions.

Thus, it may be seen that by this invention there is provided a fluid bearing construction which is readily manufactured with a minimum of dimensionally critical portions, response to applied loads may be varied as desired for particular installations, pressurized fluid used is minimized for support obtained, and many other advantages. Torque loads perpendicular to the free rotational axis are readily resisted with the conical surfaces directed toward each other since such torque loads cause immediate confrontation of the spaced conical surfaces rather than relative slipping movement between the surfaces. Moreover, with the apexes of the conical surfaces meeting at a point 17 on the free rotational axis 13, any expansion or contraction of rotor or stator with respect to the other due to difference in temperature or materials employed will not cause an appreciable change in the gaps at the inlet and outlet orifices. This due to the fact that the rotor or stator or both will be expanding or contracting like portions of a solid sphere having a center at point 17 and thus relative change will be along the conical surfaces thereby not changing the gap. This permits the sometimes desirable use of different materials for the rotor and stator.

Having fully described my invention it is to be understood that I do not wish to be limited to the details herein set forth, or to the details illustrated in the drawings, but my invention is of the full scope of the appended claims.

I claim:

1. A fluid bearing supplied with pressurized fluid comprising a rotor and a stator adapted to rotate relative to each other about an axis, said rotor and stator each having a pair of conical surfaces concentric with said axis, said conical surfaces generally coinciding with a pair of cones having their apexes meeting at a point on said axis, each said conical surface of said rotor closely spaced from a conical surface of said stator for forming two pairs of mating conical surfaces whereby fluid between the mating surfaces supports the rotor on the stator, each pair of mating surfaces having longitudinal extremities of unequal diameters, means for feeding the pressurized fluid to a location between said rotor and stator beyond one said extremity for flowing between said surfaces, a plurality of circumferentially spaced depressions in at least one of said surfaces of each pair of mating surfaces located between said longitudinal extremities forming individual pressure pad areas with a larger space between the surfaces at the depressions than at said extremities and between said depressions, the space between said surfaces at said extremities forming orifices, and said orifices being related in cross-sectional areas for producing relatively equal fluid pressure drops across each orifice.

2. The fluid bearing of claim 1 wherein said two pair of mating conical surfaces of said rotor and stator form equal angles with the said axis of rotation.

3. The fluid bearing of claim 2 wherein the said angle between the mating conical surfaces and said axis is preselected at a value greater than 35 degrees and less than 90 degrees for accommodating predetermined loads applied to the bearing which comprise axial loads in excess of the radial loads.

4. The bearing of claim 2 wherein said angle between said mating conical surfaces and said axis is preselected at a value less than 35 degrees and substantially more than zero degrees for accommodating load supplied to the bearing comprising greater radial loads than axial loads.

5. The bearing of claim 2 wherein said angle between said mating conical surfaces and said axis is approximately 35 degrees for causing the bearing to respond isoelastically to applied loads by equal compliance to both radial and axial loads.

References Cited by the Examiner

UNITED STATES PATENTS

| | | | |
|---|---|---|---|
| 2,673,767 | 3/1954 | Schoeppner | 308—240 |
| 2,695,198 | 11/1954 | Brugger | 308—170 |
| 2,822,223 | 2/1958 | Offen. | |
| 2,929,548 | 3/1960 | Crooks et al. | 308—122 |
| 2,937,294 | 5/1960 | Macks. | |
| 2,941,851 | 6/1960 | Boyer | 308—122 |
| 2,983,832 | 5/1961 | Macks | 308—9 |
| 3,043,635 | 7/1962 | Bard. | |
| 3,063,041 | 11/1962 | Quade et al. | |
| 3,101,224 | 8/1963 | Adams | 308—122 |
| 3,107,950 | 10/1963 | Kleven | 308—10 |

FOREIGN PATENTS 181,468   3/1955   Austria.

DON A. WAITE, *Primary Examiner.*

FRANK SUSKO, ROBERT C. RIORDON, *Examiners.*